(12) United States Patent
Arisaka

(10) Patent No.: US 6,840,353 B2
(45) Date of Patent: Jan. 11, 2005

(54) ROTARY DAMPER

(75) Inventor: Oomi Arisaka, Chigasaki (JP)

(73) Assignee: Piolax, Inc., Kanagawa (JP)

( * ) Notice: Subject to any disclaimer, the term of this patent is extended or adjusted under 35 U.S.C. 154(b) by 0 days.

(21) Appl. No.: 10/398,165

(22) PCT Filed: Oct. 25, 2001

(86) PCT No.: PCT/JP01/09373

§ 371 (c)(1),
(2), (4) Date: Apr. 2, 2003

(87) PCT Pub. No.: WO02/36983

PCT Pub. Date: May 10, 2002

(65) Prior Publication Data

US 2004/0035652 A1 Feb. 26, 2004

(30) Foreign Application Priority Data

Oct. 26, 2000 (JP) ......................... 2000-326347

(51) Int. Cl.[7] ............................. F16D 63/00; F16F 7/04
(52) U.S. Cl. ........................ 188/83; 188/130; 267/201
(58) Field of Search ..................... 188/83, 290, 82.6, 188/82.8, 82.84, 130, 381; 16/51, 61, 85, 86 R, 86 A; 267/201, 196, 205

(56) References Cited

U.S. PATENT DOCUMENTS

| 4,574,423 | A | * | 3/1986 | Ito et al. ......................... 16/85 |
| 5,277,282 | A | * | 1/1994 | Umemura ..................... 188/290 |
| 5,381,877 | A | * | 1/1995 | Kobayashi .................. 188/290 |
| 5,449,054 | A | * | 9/1995 | Wiese et al. ................. 188/296 |
| 5,497,863 | A | * | 3/1996 | Schmidt et al. ............. 188/306 |
| 5,542,508 | A | * | 8/1996 | Van Erden et al. ......... 188/130 |
| 5,660,252 | A | * | 8/1997 | Lafon ........................... 188/83 |

FOREIGN PATENT DOCUMENTS

| EP | 732522 | 9/1996 | |
| GB | 2296545 | 7/1996 | |
| JP | 54-53182 | 4/1979 | |
| JP | 61-157723 | 9/1986 | |
| JP | 04-337131 A | * 11/1992 | .................. 188/83 |
| JP | 6-185559 | 7/1994 | |
| JP | 7-98035 | 4/1995 | |
| JP | 7-52981 | 12/1995 | |
| JP | 2001-472203 A | * 6/2001 | ............. F16F/7/04 |
| JP | 2002250388 A | * 9/2002 | ............. F16F/7/06 |

OTHER PUBLICATIONS

CD–ROM of the specification and drawings annexed to the request of Japanese Utility Model Application No. 62978/1991 (Laid–open No. 8075/1993), (Kato Spring Co., Ltd.), Feb. 2, 1993.

* cited by examiner

Primary Examiner—Thomas Williams
(74) Attorney, Agent, or Firm—Wenderoth, Lind & Ponack, L.L.P.

(57) ABSTRACT

A rotary damper includes a housing (1) that has a holding chamber (4), a rotor (2) integral with a gear (2a) disposed rotatably in the holding chamber (4) of the housing (1), and a braking member (3) for controlling the rotation of the rotor (2). The braking member (3) is interposed between the outer periphery of the rotor (2) and the inner periphery the holding chamber (4). A supporting shaft (5) is erected on the bottom part of the holding chamber (4) of the housing (1). A through-hole (7) is bored in the rotor for permitting insertion therein of the supporting shaft (5) in the axial direction of the rotor (2). The rotor (2) is supported through the supporting shaft (5) and the through-hole (7). With this configuration, a stabilized braking force is constantly provided because the rotor (2) does not incline it is being rotated.

9 Claims, 5 Drawing Sheets

ROTARY DAMPER

TECHNICAL FIELD

This invention relates to improvements in and concerning a rotary damper to be used in a push-open ashtray in an automobile, for example.

BACKGROUND ART

The damper illustrated in FIG. 2 of JP-A HEI 7-98035 has heretofore been known as belonging in this class of dampers.

The conventional rotary damper, though not specifically illustrated herein, is provided with a housing that has a holding chamber. It is further provided with a rotor integral with a gear, which rotor is disposed rotatably in the holding chamber of the housing, and a braking sheet interposed between the bottom part of the holding chamber of the housing and the lower surface of the rotor. It is so constructed that it enables application of the braking force to the speed of opening the push-open ashtray by utilizing the frictional resistance generated between the rotor and the braking sheet due to the sliding rotation of the rotor on the braking sheet.

The conventional rotary damper is used to control the push-open ashtray as follows. The housing of the damper is fixed onto either an ashtray case or a frame serving to retain the ashtray case so that the ashtray case can emerge from and submerge under the frame. A rack is disposed on the remainder of the two components. The rack and the gear with which the rotor is integral are meshed with each other. Thereafter, the ashtray case is released from the locked state at the closing position thereof to enable the ashtray case to move in the opening direction by dint of the pressure energized with a spring. Consequently, it is made possible to set the rotor rotating in compliance with the motion of the ashtray case, and induce generation of the frictional resistance between the lower surface of the rotor and the braking sheet. As a result, the ashtray case can move slowly in the opening direction.

The conventional rotary damper, therefore, has the advantage of allowing simplification of construction because it is composed of three components. When the rotor integral with the gear is disposed within the holding chamber of the housing, however, it will readily incline and possibly impair the stability of the braking force while it is in the process of rotating and sliding on the braking sheet. This is because the posture of the rotor is retained by a flange disposed on the edge of an opening of the holding chamber.

This invention has been developed with the object of effectively solving such problems as are encountered by the conventional rotary damper.

SUMMARY OF THE INVENTION

This invention provides a rotary damper comprising a housing that has a holding chamber, a rotor integral with a gear, which rotor is disposed rotatably in the holding chamber of the housing, and a braking member for controlling rotation of the rotor. The braking member is interposed between an outer periphery of the rotor and an inner periphery of the holding chamber, and the holding chamber of the housing has a bottom part on which a supporting shaft is erected. The rotor has a shaft-hole bored therein in an axial direction for permitting insertion therein of the supporting shaft, and the rotor is supported through the supporting shaft and the shaft-hole. Since the braking member is interposed between the outer periphery of the rotor and the inner periphery of the holding chamber and the rotor is supported on the supporting shaft erected on the bottom part of the holding chamber, the rotor will never incline while it is being rotated. Consequently, the braking force can be provided in a stable form at all times.

This invention contemplates forming an annular lock groove either on the supporting shaft or on the inner peripheral surface of the shaft-hole of the rotor and disposing on the remainder thereof an engaging claw capable of being movably meshed with the lock groove. Thus, the imposition of the rotary damper will be attained by a touch. In addition, the rotor will never accidentally slip off the supporting shaft because the insertion of the supporting shaft of the holding chamber into the shaft hole of the rotor suffices to mesh the engaging claw with the lock groove.

This invention further contemplates forming an annular plain groove on the outer periphery of the rotor and setting in the plain groove an O-ring that is the braking member. Since the O-ring as the braking member is set in the plain groove of the rotor, it has no possibility of accidentally dropping off the rotor, and the braking force can be provided in a more stable form.

According to this invention, the coefficient of friction of the rotor is smaller than that of the housing. Thus, since the braking member is fixed on the housing and the rotor alone is allowed to rotate while it is prevented from producing a sympathetic rotation with the braking member, the braking force can be provided in a stabilized form.

In this invention, either the engaging claw or the annular lock groove is disposed on the inner peripheral surface of the shaft-hole on the gear side. Thus, the engaging claw will secure an infallible state of engagement with the lock groove. Consequently, the rotor will never incline relative to the supporting shaft because the parts of engagement of the engaging claw and the lock groove, respectively, are disposed on the inner peripheral surface of the gear that is prone to exertion of an outer force.

In this invention, the O-ring is used as the braking member and allowed to additionally contact the bottom part of the holding chamber of the housing. Consequently, it contacts the housing at two points, one on the inner peripheral surface and the other on the bottom surface, and contacts the rotor only at one point. Therefore, the O-ring will produce no sympathetic rotation with the housing and slides on the rotor, and the braking force can be provided in a stable form as well.

DETAILED DESCRIPTION OF THE INVENTION

Figure 1:
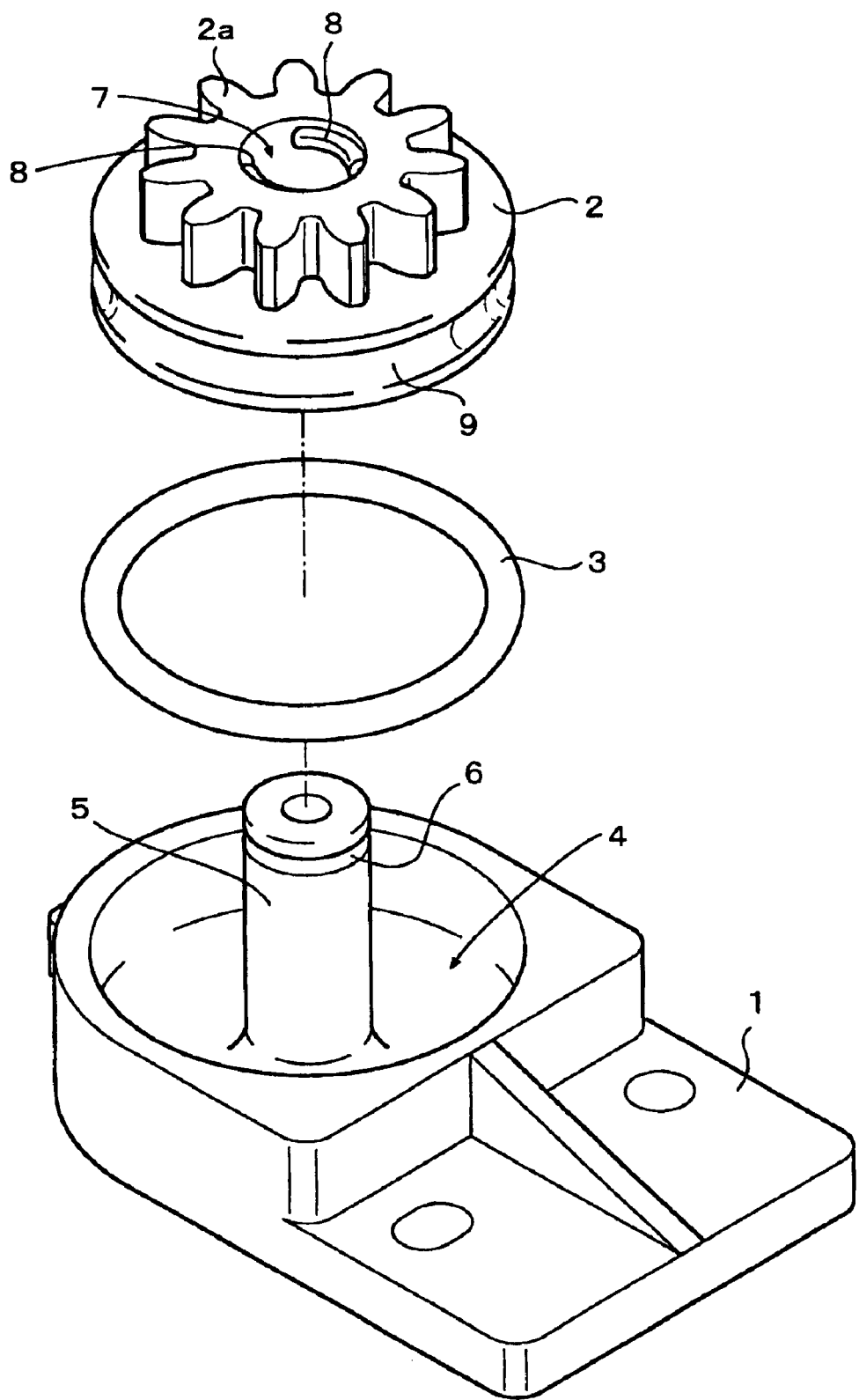
FIG. 1 is an exploded perspective view of the rotary damper according to one embodiment of this invention.

This invention will be described in detail below with reference to preferred embodiments illustrated in the drawings. A rotary damper according to one embodiment comprises three parts as illustrated in FIG. 1. A housing 1 has a holding chamber 4 open on one surface side. A rotor 2 is integral with a gear 2a that is disposed rotatably in the holding chamber 4 of the housing 1. An O-ring 3 constitutes a braking member for controlling the rotation of the rotor 2.

Figure 2:
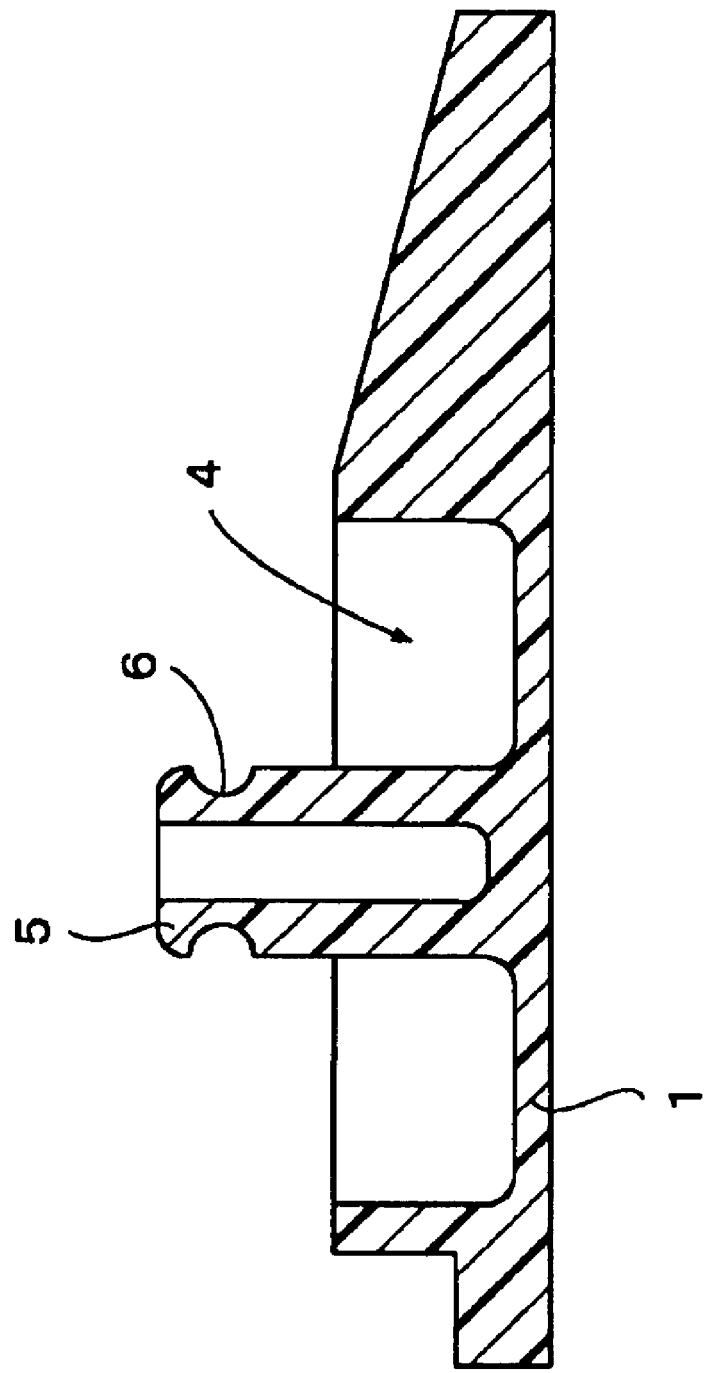
FIG. 2 is a cross section of the housing.
Figure 3:
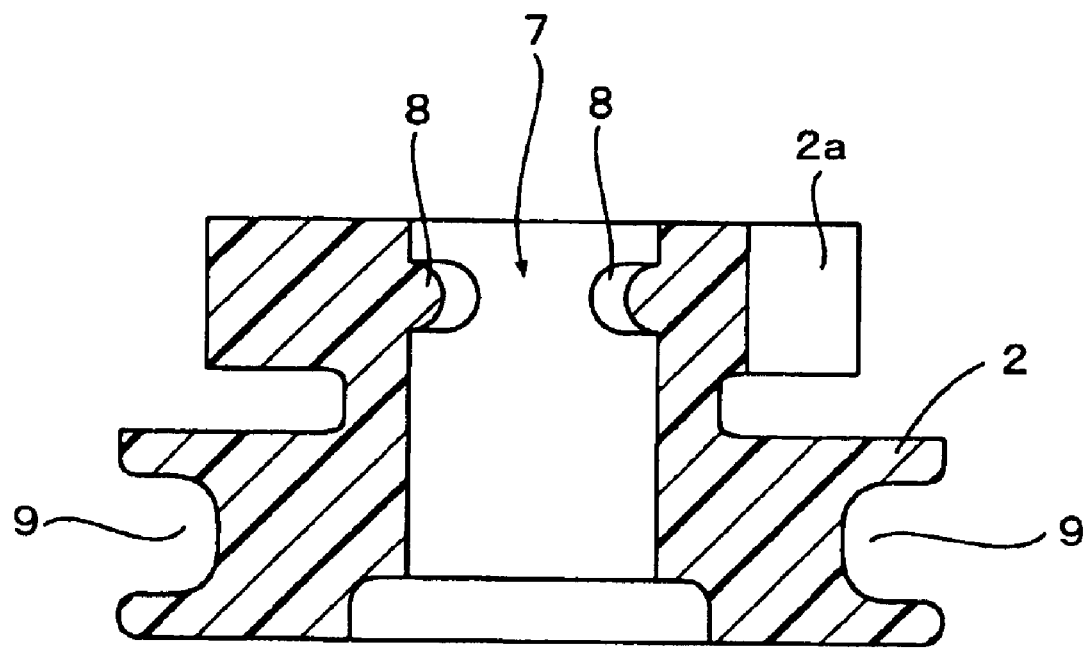
FIG. 3 is a cross section of a rotor integral with a gear.
Figure 5:
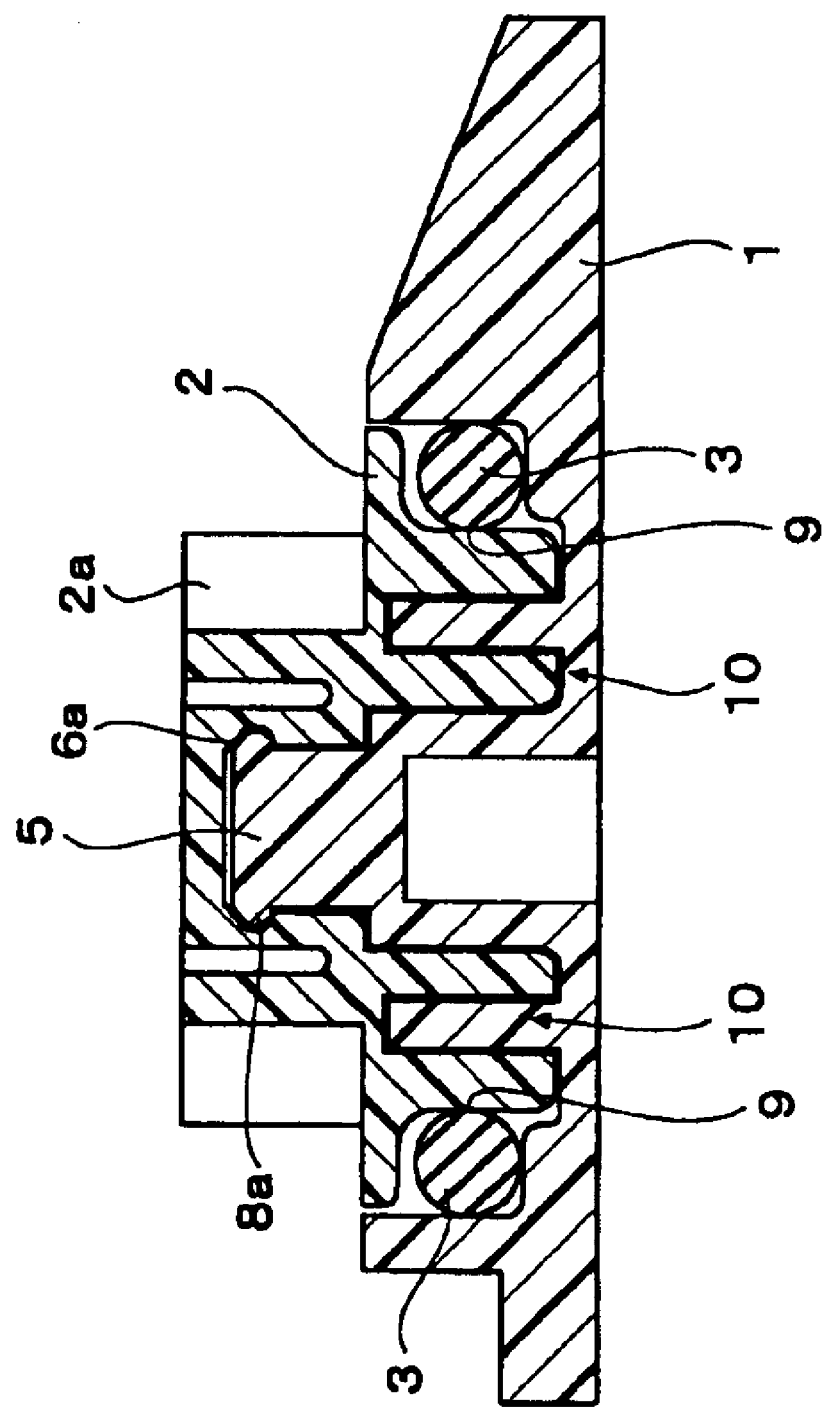
FIG. 5 is a cross section illustrating a rotary damper according to another embodiment of this invention in an assembled state.

In the present embodiment, the housing 1 has a supporting shaft 5 erected at the center of the bottom part of the holding chamber 4, and has an annular locking groove 6 (i.e., an engagement member) formed in the leading terminal part (distal end) of the supporting shaft 5 as illustrated in FIG. 2. As illustrated in FIG. 3, the rotor 2 integral with the gear 2a has a shaft through-hole 7 bored therein for permitting insertion therethrough of the supporting shaft 5 inclusive of the integrating gear 2a in the axial direction thereof. Of course, the shaft hole 7 does not need to be a through-hole, as shown in FIG. 5. It further has a pair of engaging claws 8 (i.e., an engaging member) formed on the inner peripheral surface of through-hole 7 on the gear 2a side of the through-hole 7, and the claws 8 are adapted to be movably meshed with (engage) the locking groove 6 of shaft 5. As illustrated in, for example, FIG. 3, the engaging member (in this case, engaging claws 8) of rotor 2 is located on an inner periphery of gear 2a so as to be located in a plane of gear 2a. The outer periphery of the rotor 2 is formed with an annular plain groove 9 for permitting the O-ring 3 to be imposed therein.

Figure 4:
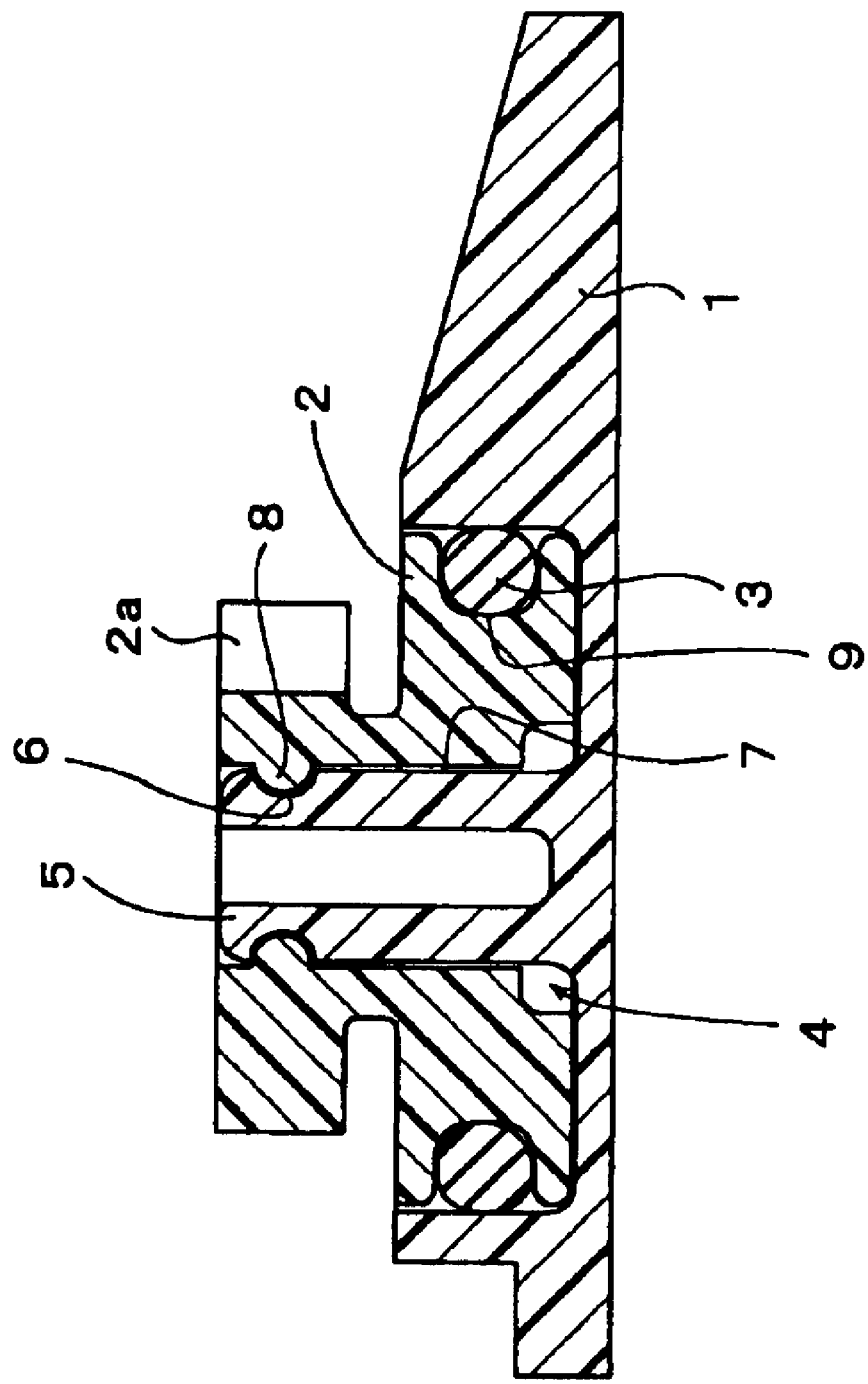
FIG. 4 is a cross section illustrating the rotary damper in an assembled state.

The assemblage of the rotary damper of this construction is attained in the following manner. The O-ring 3 is inserted in the plain groove 9 of the rotor 2, and the supporting shaft 5 of the housing 1 is then inserted into the through-hole 7 of the rotor 2. As a result, the individual engaging claws 8 (engaging member) of the through-hole 7 are meshed with the locking groove 6 of the supporting shaft 5. By this procedure, the rotary damper is assembled as illustrated in FIG. 4 by a touch (i.e., a push). Moreover, the state of engagement of the engaging claws 8 with the locking groove 6 is such as to allow the rotor 2 to rotate and prevent the rotor 2 from accidentally slipping out. Optionally, the rotary damper may have, on the supporting shaft 5, engaging claws 8a and have on the inner peripheral surface of a shaft hole 7 of the rotor, a locking groove 6a as illustrated in FIG. 5. This establishes engagement between the locking groove 6a and the engaging claws 8a. In this case, the O-ring 3 is interposed between the outer periphery of the rotor 2 and the inner periphery of the holding chamber 4 through the plain groove 9.

The control of a push-open ashtray with the rotary damper according to the present invention, therefore, is accomplished as follows, though not specifically illustrated. The housing 1 of the damper is fixed onto one of an ashtray case and a frame capable of retaining the ashtray case so as to emerge therefrom and submerge thereunder, and a rack is disposed on the other of the ashtray case and frame. The rack is then meshed with the integrating gear 2a of the rotor 2. Subsequently, the ashtray case is released from the locked state at the closing position to allow the ashtray case to move in the opening direction with the emerging pressure of a spring. The rotor 2 can move in compliance with the motion of the ashtray case, and frictional resistance is generated between the O-ring 3 and the inner peripheral surface of the holding chamber 4 or between the O-ring 3 and the inner peripheral surface of the plain groove 9. The rotary damper, therefore, causes the ashtray case to be slowly moved in the opening direction in any event.

In this case, the O-ring acts as a braking member interposed between the outer periphery of the rotor and the inner periphery of the holding chamber 4. Furthermore, the rotor 2 is held on the supporting shaft 5 that is erected on the bottom part of the holding chamber 4 of the housing 1. Therefore, the rotor 2 will never incline during the course of rotation and will always provide a stabilized braking force. Moreover, due to the disposition of the engaging parts of the engaging claws 8 and the locking groove 6, respectively, on the inner peripheral surface of the gear 2a which is prone to exertion of an outer force, the engaging claw 8 can be infallibly engaged with the locking groove 6. Therefore, the rotor 2 will never incline relative to the supporting shaft 5.

When frictional resistance between the O-ring 3 and the inner peripheral surface of the plain groove 9 is to be generated in the present embodiment, the coefficient of friction of the rotor 2 is set smaller than that of the housing 1. This allows the O-ring 3 to be fixed on the housing 1, and for the rotor 2 alone to be rotated. It is consequently made possible to prevent the rotor 2 from producing sympathetic rotation with the O-ring 3 and to provide a stabilized braking force.

Furthermore, due to the insertion of the O ring (i.e., a braking member) in the plain groove 9 of the rotor 2, the O-ring 3 will have no possibility of accidentally falling off the rotor 2. Consequently, the rotary damper can eventually provide a further stabilized braking force.

The preceding embodiment has been described as controlling the push-open ashtray solely with the O-ring 3. However, when the frictional resistance of the O-ring 3 is insufficient for generating necessary braking force, the embodiment shown in FIG. 5, for example, is adopted. In this embodiment, an annular jogging part 10 adapted to alternatively mesh with the housing and the rotor is formed, and the gaps in the jogging part 10 are filled with viscous oil. As a result, it is possible to attain thorough compensation for the shortage of the braking force.

In this case, part of the rotor 2 is removed to allow the O-ring 3 to also contact the bottom part of the holding chamber 4 of the housing 1 as shown in the diagram. As a result, it is possible for the O-ring 3 to contact the housing 1 at two points, one each on the inner peripheral surface and the bottom surface, and to contact the rotor 2 at one point. Thus, the rotary damper can provide a stabilized braking force because the O-ring 3 produces no sympathetic rotation with the housing 1 and slides on the rotor 2.

In the construction of this description, the rotor 2 can be incorporated in the assembly of the rotary damper, with the O-ring 3 set beforehand in the housing 1. In this case, the O-ring 3 produces no sympathetic rotation with the rotor 2, and the rotary damper can provide a stabilized braking force because the rotor 2 and the O-ring 3 contact each other only between their respective outside diameter and inside diameter.

INDUSTRIAL APPLICABILITY

The rotary damper contemplated by this invention can always provide a stabilized braking force because the rotor does not incline while it is being rotated. This is because the braking member (i.e., O-ring) is interposed between the outer periphery of the rotor and the inner periphery of the holding chamber, and because the rotor 2 is supported on the supporting shaft erected on the bottom part of the holding chamber.

Furthermore, the assemblage of the rotary damper can be attained by a touch and the rotor will never slip off the supporting shaft. This is because the insertion of the supporting shaft of the holding chamber into the through-hole of the rotor suffices to have the engaging claws meshed with the locking groove.

The O-ring has no possibility of accidentally falling off the rotor because the O-ring serving as a braking member is inserted in the plain groove of the rotor. As a result, the rotary damper can provide a more stabilized braking force.

The possibility that the rotor will produce sympathetic rotation with the braking member is eliminated because the braking member is fixed onto the housing and the rotor alone is allowed to rotate. As a result, the rotary damper can provide a stabilized braking force.

The engaging claws are allowed to secure a state of infallible engagement with the locking groove because the engaging part of the engaging claws or the locking groove is disposed on the inner peripheral surface of the gear which is prone to exertion of an outer force. As a result, the rotor will never incline relative to the supporting shaft.

The O-ring produces no sympathetic rotation with the housing and slides on the rotor because the O-ring also contacts the bottom part of the holding chamber of the housing. It consequently contacts the housing at two points, one each of the inner peripheral face and the bottom face thereof, and contacts the rotor at one point. Thus, the rotary damper can provide a stabilized braking force.

What is claimed is:

1. A rotary damper comprising:
    a housing having a holding chamber with a bottom surface, said housing further having a shaft extending from said bottom surface, said shaft having a first engaging member on an outer surface thereof;
    a rotor having a gear integrally formed thereon so as to have a one-piece construction, said rotor having a shaft hole extending in an axial direction thereof, said shaft hole having a second engaging member formed on a surface thereof so that said second engaging member is located on an inner periphery of said gear in a plane of said gear, said rotor being arranged in said holding chamber so that said shaft of said housing is inserted into said shaft hole of said rotor such that said first engaging member of said shaft engages said second engaging member of said rotor to thereby hold and rotatably support said rotor on said housing; and
    a braking member arranged between an outer periphery of said rotor and an inner periphery of said holding chamber, for controlling a rotation of said rotor relative to said housing.

2. The rotary damper of claim 1, wherein said first engaging member of said shaft comprises an annular locking groove, and said second engaging member of said rotor comprises engaging claws removably meshing with said annular locking groove so as to engage said annular locking groove.

3. The rotary damper of claim 1, wherein said first engaging member of said shaft comprises engaging claws, and said second engaging member of said rotor comprises an annular locking groove removably meshing with said engaging claws so as to engage said engaging claws.

4. The rotary damper of claim 1, wherein said rotor further has an annular groove formed around an outer periphery of said rotor, said braking member comprising an O-ring arranged within said annular groove.

5. The rotary damper of claim 4, wherein said O-ring is arranged within said annular groove so that an entirety of an inner periphery of said O-ring contacts said rotor and an entirety of an outer periphery of said O-ring contacts said housing.

6. The rotary damper of claim 1, wherein said rotor has a coefficient of friction smaller than a coefficient of friction of said housing.

7. The rotary damper of claim 1, wherein said braking member comprises an O-ring arranged to contact said outer periphery of said rotor, said inner periphery of said holding chamber, and said bottom surface of said holding chamber.

8. The rotary damper of claim 1, wherein said shaft hole of said rotor comprises a through-hole extending entirely through said rotor in the axial direction of said rotor.

9. The rotary damper of claim 8, wherein said shaft of said housing is inserted into said shaft through-hole so as to extend the entire length of said shaft through-hole.

* * * * *